(12) United States Patent
Uemura et al.

(10) Patent No.: US 12,187,855 B2
(45) Date of Patent: Jan. 7, 2025

(54) INTERMEDIATE FOR BLOCK COPOLYMER, BLOCK COPOLYMER, AND METHODS FOR PRODUCING SAME

(71) Applicant: DIC Corporation, Tokyo (JP)

(72) Inventors: Yukie Uemura, Takaishi (JP); Youki Kou, Takaishi (JP); Hisakazu Tanaka, Takaishi (JP)

(73) Assignee: DIC Corporation, Tokyo (JP)

( * ) Notice: Subject to any disclaimer, the term of this patent is extended or adjusted under 35 U.S.C. 154(b) by 517 days.

(21) Appl. No.: 17/617,109

(22) PCT Filed: Jun. 4, 2020

(86) PCT No.: PCT/JP2020/022041
§ 371 (c)(1),
(2) Date: Dec. 7, 2021

(87) PCT Pub. No.: WO2020/255726
PCT Pub. Date: Dec. 24, 2020

(65) Prior Publication Data
US 2022/0227945 A1 Jul. 21, 2022

(30) Foreign Application Priority Data
Jun. 20, 2019 (JP) .................. 2019-114712

(51) Int. Cl.
*C08G 81/02* (2006.01)
*C08F 8/20* (2006.01)

(52) U.S. Cl.
CPC .............. *C08G 81/021* (2013.01); *C08F 8/20* (2013.01)

(58) Field of Classification Search
CPC .. C08G 81/021; C08F 2810/40; C08F 299/00; C08F 20/12; C08F 12/08
See application file for complete search history.

(56) References Cited

U.S. PATENT DOCUMENTS

| 4,351,924 A * | 9/1982 | Andrews .................... C08F 8/02 560/205 |
| 5,789,487 A * | 8/1998 | Matyjaszewski ... C08F 290/068 526/172 |
| 2016/0229943 A1* | 8/2016 | Uemura .................... C08F 8/12 |

FOREIGN PATENT DOCUMENTS

| JP | 2010-180353 A | 8/2010 |
| JP | 2015-131873 A | 7/2015 |
| WO | 2015/041146 A1 | 3/2015 |

OTHER PUBLICATIONS

Quirk, Rubber Chemistry and Technology, vol. 64, 1991, p. 648-660 (Year: 1991).*
Wiles, Transactions of the Faraday Society, vol. 61, 1965, p. 150-158 (Year: 1965).*
Yasuhiro Kohsaka et al., "Precise Anionic Polymerization of Methyl Methacrylate: Simultaneous Control of Molecular Weight, Stereoregularity, and Terminal Structure" Journal of the Japan Rubber Association, vol. 88, No. 3, 2015, pp. 16-21 including an English abstract and English machine translation thereof.
Katsuhiko Takenaka "Transformation and Control of End-functional Groups via Anionic Polymerization," Polymer vol. 47, February Issue 1998, pp. 70-73 and English machine translation thereof.

* cited by examiner

*Primary Examiner* — Robert C Boyle
(74) *Attorney, Agent, or Firm* — Locke Lord LLP; James E. Armstrong, IV; Nicholas J. DiCeglie, Jr.

(57) ABSTRACT

Provided are a block copolymer having a narrow molecular weight distribution such that the copolymer can be used in a DSA technique, a block copolymer intermediate thereof, and methods for producing the same. A block copolymer intermediate represented by the general formula (1) or (2):

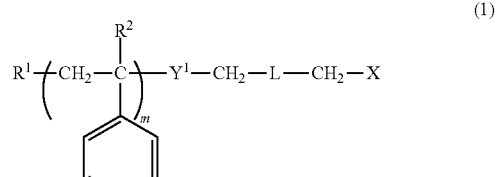

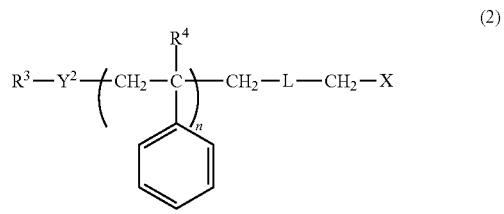

wherein, in the formulae (1) and (2), each of $R^1$ and $R^3$ independently represents a polymerization initiator residue, each of $R^2$ and $R^4$ independently represents an aromatic group or an alkyl group, $Y^1$ represents a polymer block of (a)an (meth)acrylic acid ester, $Y^2$ represents a polymer block of styrene or a derivative thereof, L represents an alkylene group or a phenylene group, X represents a halogen group, and each of m and n independently represents an integer of 1 to 5.

6 Claims, 2 Drawing Sheets

INTERMEDIATE FOR BLOCK COPOLYMER, BLOCK COPOLYMER, AND METHODS FOR PRODUCING SAME

TECHNICAL FIELD

The present invention relates to a block copolymer intermediate, a block copolymer, and methods for producing the same.

BACKGROUND ART

In the semiconductor industry in which the device size continues shrinking to increase the integration degree, instead of the photolithography technique, a new microfabrication technique is required. In this situation, a DSA (Directed Self-Assembly) technique has attracted attention, wherein the technique artificially controls a self-assembly phenomenon such that a polymer forms a periodic structure having a nanometer size, forming very fine resist patterns. In recent years, a DSA technique using a diblock copolymer as a self-assembly material is being studied, and with respect to the polystyrene-polymethacrylate block copolymer and the like, a number of reports of studies about the composition, molecular weight, and the like have been made. However, the block copolymer has a problem in that the molecular weight and the degree of dispersion of the block copolymer directly contribute to the pattern size and precision, and hence even a slight change of the block copolymer being synthesized largely affects the performance of the obtained copolymer. Accordingly, precise control of the molecular weight and the degree of dispersion of the individual blocks is indispensable to the development of a block copolymer for DSA.

As a method for obtaining a block copolymer having a low degree of dispersion and a narrow molecular weight distribution, there is a living anionic polymerization method (see, for example, PTL 1). The initiation method, in which, using an alkyllithium as an initiator, a first monomer is polymerized and then a second monomer is successively polymerized to synthesize a block copolymer, is advantageous in that the process is simple, but has a problem in that even a slight amount of water or oxygen affects the reaction, making it difficult to precisely control the satisfactory molecular weight distribution, and thus it is difficult to obtain a block copolymer having precisely controlled the molecular weight and the degree of dispersion of the individual polymer blocks. Further, the initiation method has a problem in that the selectivity of the first monomer and second monomer is limited.

Therefore, a block copolymer which can be used in a DSA technique and a method for producing the same have been desired.

CITATION LIST

Patent Literature

PTL 1: JP-A-2010-180353

SUMMARY OF INVENTION

Technical Problem

A task to be achieved by the present invention is to provide a block copolymer having a narrow molecular weight distribution such that the copolymer can be used in a DSA technique, a block copolymer intermediate thereof, and methods for producing the same.

Solution to Problem

The present inventors have conducted extensive and intensive studies with a view toward solving the above-mentioned problems. As a result, it has been found that, when a block copolymer is synthesized using a block copolymer intermediate having a specific structure, a block copolymer which can be used in a DSA technique can be obtained. Further, it has been found that the block copolymer intermediate and the block copolymer can be efficiently produced by a specific method, and the present invention has been completed.

Specifically, in the present invention, there is provided a block copolymer intermediate represented by the following general formula (1) or (2):

[Chem. 1]

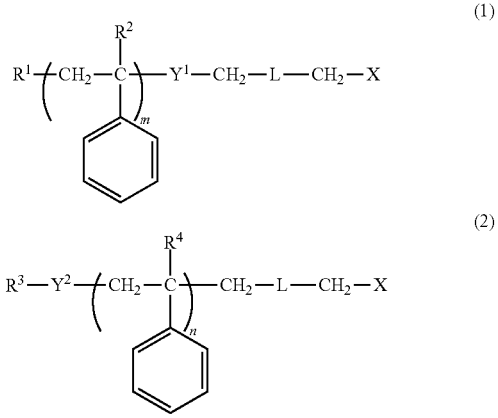

wherein, in the general formulae (1) and (2), each of $R^1$ and $R^3$ independently represents a polymerization initiator residue, each of $R^2$ and $R^4$ independently represents an aromatic group or an alkyl group, $Y^1$ represents a polymer block of (a)an (meth)acrylic acid ester, $Y^2$ represents a polymer block of styrene or a derivative thereof, L represents an alkylene group, a phenylene group, or a single bond, X represents a halogen atom, and each of m and n independently represents an integer of 1 to 5.

Further, in the present invention, there is provided a block copolymer represented by the following general formula (3):

[Chem. 2]

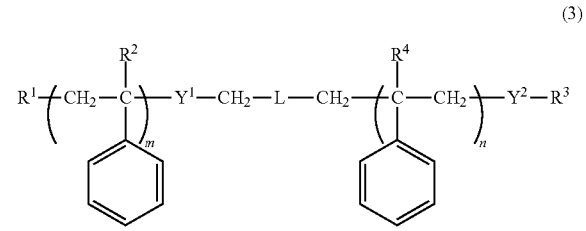

wherein, in the general formula (3), each of $R^1$ and $R^3$ independently represents a polymerization initiator residue, each of $R^2$ and $R^4$ independently represents an aromatic group or an alkyl group, $Y^1$ represents a polymer block of (a)an (meth)acrylic acid ester, $Y^2$ represents a polymer block of styrene or a derivative thereof, L represents an alkylene group, a phenylene group, or a single bond, and each of m and n independently represents an integer of 1 to 5.

Further, there are provided a method for producing the block copolymer intermediate represented by the general formula (1) or (2) above, and a method for producing the block copolymer represented by the general formula (3) above.

Advantageous Effects of Invention

The block copolymer intermediate of the present invention is useful as a raw material for a block copolymer having a narrow molecular weight distribution such that the copolymer can be used in a DSA technique. Further, with respect to the block copolymer of the invention, as compared to a block copolymer obtained by a conventional initiation method, the molecular weight of each of the first polymer block and the second polymer block is precisely controlled, and the molecular weight of the block copolymer is precisely controlled, and thus the block copolymer of the invention is a block copolymer having a narrow molecular weight distribution such that the copolymer can be used in a DSA technique. Further, the method for producing the block copolymer of the invention is a method in which a first polymer block and a second polymer block are separately synthesized and bonded together by a coupling agent, and therefore is such an excellent method that the difficulty of the synthesis is low, and the molecular weight and molecular weight distribution of each of the first polymer block and the second polymer block can be achieved according to the design thereof.

DESCRIPTION OF EMBODIMENTS

Figure 1:
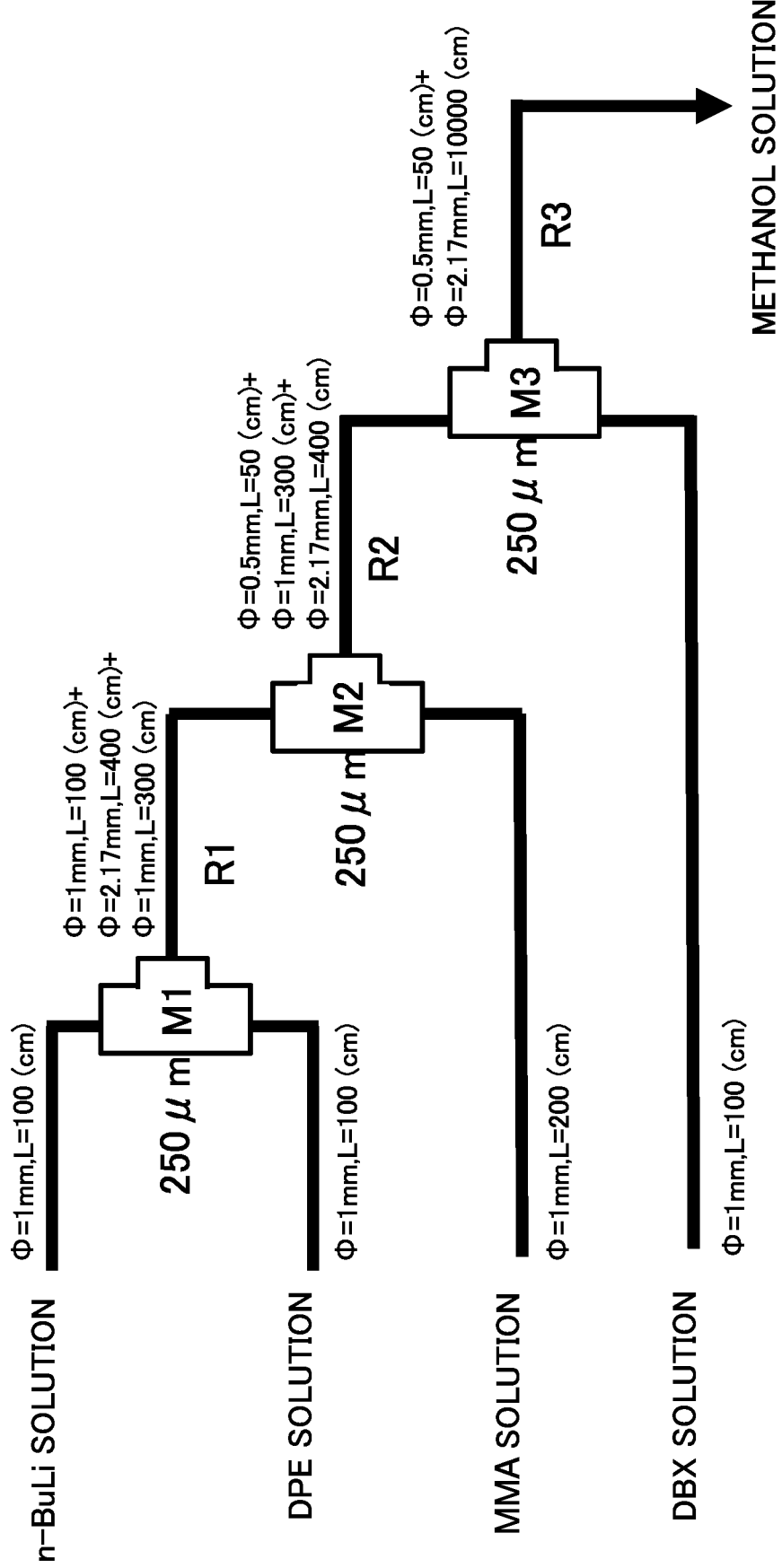
FIG. 1 shows a simplified procedure for reaction in Example 1.

The block copolymer intermediate of the present invention is represented by the following general formula (1) or (2):

[Chem. 3]

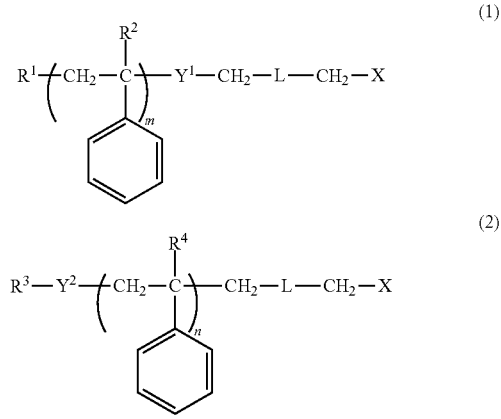

wherein, in the general formulae (1) and (2), each of $R^1$ and $R^3$ independently represents a polymerization initiator residue, each of $R^2$ and $R^4$ independently represents an aromatic group or an alkyl group, $Y^1$ represents a polymer block of (a)an (meth)acrylic acid ester, $Y^2$ represents a polymer block of styrene or a derivative thereof, L represents an alkylene group, a phenylene group, or a single bond, X represents a halogen atom, and each of m and n independently represents an integer of 1 to 5.

In the general formulae (1) and (2) above, each of $R^1$ and $R^3$ independently represents a polymerization initiator residue. As the polymerization initiator, for example, there can be mentioned an organolithium polymerization initiator. Examples of the organolithium polymerization initiators include alkyllithiums, such as methyllithium, ethyllithium, propyllithium, butyllithium (n-butyllithium, sec-butyllithium, iso-butyllithium, and tert-butyllithium), pentyllithium, hexyllithium, methoxymethyllithium, and ethoxymethyllithium; phenylalkylenelithiums, such as benzyllithium, α-methylstyryllithium, 1,1-diphenyl-3-methylpentyllithium, 1,1-diphenylhexyllithium, and phenylethyllithium; alkenyllithiums, such as vinyllithium, allyllithium, propenyllithium, and butenyllithium; alkynyllithiums, such as ethynyllithium, butynyllithium, pentynyllithium, and hexynyllithium; aryllithiums, such as phenyllithium and naphthyllithium; heterocyclic lithiums, such as 2-thienyllithium, 4-pyridyllithium, and 2-quinolyllithium; and alkyllithium-magnesium complexes, such as tri(n-butyl)magnesium-lithium and trimethylmagnesium-lithium. These polymerization initiators can be used individually or in combination.

The organolithium polymerization initiator has properties such that bonding between the organic group and lithium suffers cleavage so that the organic group side causes an activating end, from which polymerization is initiated. Therefore, the resultant polymer end has bonded thereto an organic group derived from the organolithium. In the invention, the organolithium-derived organic group bonded to the polymer end is referred to as "organolithium polymerization initiator residue". For example, in the polymer obtained using methyllithium as a polymerization initiator, the organolithium polymerization initiator residue is a methyl group, and, in the polymer obtained using butyllithium as an initiator, the organolithium polymerization initiator residue is a butyl group.

In the general formula (1) above, $Y^1$ represents a polymer block of (a)an (meth)acrylic acid ester. Examples of the (meth)acrylic acid esters include alkyl (meth)acrylates, such as methyl (meth)acrylate, ethyl (meth)acrylate, n-butyl (meth)acrylate, sec-butyl (meth)acrylate, t-butyl (meth) acrylate, isopropyl (meth)acrylate, isobutyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; aromatic (meth)acrylates, such as benzyl (meth)acrylate and phenylethyl (meth)acrylate; (meth)acrylates having a cyclic compound, such as cyclohexyl (meth)acrylate and isobornyl (meth)acrylate; silane (meth)acrylates, such as trimethylsiloxyethyl (meth)acrylate; (meth)acrylates having a siloxy group, such as a dialkylsiloxy group, a diphenylsiloxy group, a trialkylsiloxy group, or a triphenylsiloxy group; alkylpolyalkylene glycol mono(meth)acrylates, such as methoxypolyethylene glycol mono(meth)acrylate and methoxypolypropylene glycol mono(meth)acrylate; fluorine (meth)acrylates, such as perfluoroalkylethyl (meth)acrylate; (meth)acrylate compounds, such as glycidyl (meth)acrylate, epoxy (meth)acrylate, ethylene glycol di(meth)acrylate, diethylene glycol di(meth)acrylate, trimethylolpropane tri(meth)acrylate, tetramethylene glycol tetra(meth)acrylate, 2-hydroxy-1,3-diacryloxypropane, 2,2-bis[4-(acryloxymethoxy)phenyl]propane, 2,2-bis[4-(acryloxyethoxy)phenyl]propane, dicyclopentenyl (meth)acrylate, tricyclodecanyl (meth)acrylate, tris(acryloxyethyl) isocyanurate, and urethane (meth)acrylate; and (meth)acrylates having an alkylamino group, such as dimethylaminoethyl (meth)acrylate, diethylaminoethyl (meth)acrylate, and dimethylaminopropyl (meth)acrylate.

Further, examples of the perfluoroalkylethyl (meth)acrylates include trifluoroethyl (meth)acrylate, 2-(perfluorobutyl)ethyl (meth)acrylate, 2-(perfluorohexyl)ethyl (meth)acrylate, and 2-(perfluorooctyl)ethyl (meth)acrylate.

In the present invention, the term "(meth)acrylic acid" means one of or both of methacrylic acid and acrylic acid, and the term "(meth)acrylate" means one of or both of methacrylate and acrylate.

In the general formula (1) and (2) above, each of $R^2$ and $R^4$ independently represents an aromatic group or an alkyl group. Further, with respect to the repeating units indicated by m or n in the general formulae (1) and (2) above, as a compound which is a raw material for the repeating units, there can be mentioned, for example, 1,1-diphenylethylene and α-methylstyrene. When the above-mentioned compound is 1,1-diphenylethylene, $R^2$ and $R^4$ are a phenyl group, and, when the compound is α-methylstyrene, $R^2$ and $R^4$ are a methyl group.

In the general formula (2) above, $Y^2$ represents a polymer block of styrene or a derivative thereof. Examples of the styrene derivatives include p-dimethylsilylstyrene, (p-vinylphenyl)methyl sulfide, p-hexynylstyrene, p-methoxystyrene, p-tert-butyldimethylsiloxystyrene, o-methylstyrene, p-methylstyrene, and p-tert-butylstyrene.

In the general formulae (1) and (2) above, L represents an alkylene group, a phenylene group, or a single bond. The above group or bond is a residue of the below-mentioned coupling agent, and varies depending on the type of the coupling agent used. Further, the case where L is a single bond means that the two methylene groups bonded to L are directly bonded to each other. The coupling agent is described later.

Further, in the general formulae (1) and (2) above, X represents a halogen atom, and also varies depending on the coupling agent used.

The block copolymer of the present invention is represented by the following general formula (3):

[Chem. 4]

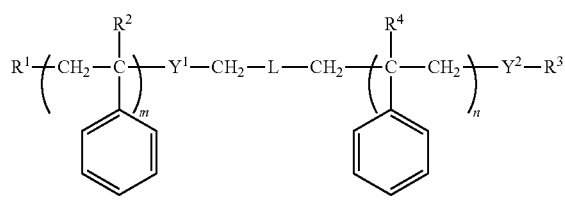

(3)

wherein, in the formula (3), each of $R^1$ and $R^3$ independently represents a polymerization initiator residue, each of $R^2$ and $R^4$ independently represents an aromatic group or an alkyl group, $Y^1$ represents a polymer block of (a)an (meth)acrylic acid ester, $Y^2$ represents a polymer block of styrene or a derivative thereof, L represents an alkylene group, a phenylene group, or a single bond, and each of m and n independently represents an integer of 1 to 5.

The characters for substituents and numbers in the general formula (3) above are as defined above.

With respect to the block containing $Y^1$ and the block containing $Y^2$ at both ends of —$CH_2$-L-$CH_2$— in the general formula (3) above, each block preferably has a weight average molecular weight in the range of from 1,000 to 1,000,000, more preferably in the range of from 3,000 to 500,000, further preferably in the range of from 5,000 to 100,000. Further, each block preferably has a degree of dispersion in the range of from 1.01 to 2, more preferably in the range of from 1.01 to 1.5, further preferably in the range of from 1.01 to 1.05.

As a method for producing the block copolymer intermediate represented by the general formula (1) above, for example, there can be mentioned a method which comprises, using a microreactor having a channel capable of mixing a plurality of liquids, reacting a polymerization initiator and diphenylethylene, and then introducing (a)an (meth)acrylic acid ester to the resultant reaction product to cause living anionic polymerization, obtaining a polymer (A), and reacting an anionic end of the polymer (A) and an alkylene compound or phenylene compound having two halogenomethyl groups.

Further, as a method for producing the block copolymer intermediate represented by the general formula (2) above, for example, there can be mentioned a method which comprises, using a microreactor having a channel capable of mixing a plurality of liquids, subjecting styrene or a derivative thereof to living anionic polymerization in the presence of a polymerization initiator, and then reacting the resultant product with diphenylethylene to obtain a polymer (S), and reacting an anionic end of the polymer (S) and an alkylene compound or phenylene compound having two halogenomethyl groups.

On the other hand, as a method for producing the block copolymer represented by the general formula (3) above, there can be mentioned the following two methods.

As a first method for producing the block copolymer, for example, there can be mentioned a method using the block copolymer intermediate represented by the general formula (1) above. This method is a method which comprises, using a microreactor having a channel capable of mixing a plurality of liquids or a batch reactor, subjecting styrene or a derivative thereof to living anionic polymerization in the presence of an alkyllithium, and then reacting the resultant product with diphenylethylene to obtain a polymer (S), and bonding the polymer (S) and the block copolymer intermediate represented by the general formula (1), which is obtained by the above-mentioned method, by a displacement reaction of an anionic end of the polymer (S) by a halogen atom of the block copolymer intermediate.

Further, as a second method for producing the block copolymer, for example, there can be mentioned a method using the block copolymer intermediate represented by the general formula (2) above. This method is a method which comprises, using a microreactor having a channel capable of mixing a plurality of liquids or a batch reactor, reacting an alkyllithium and diphenylethylene, and then introducing (a)an (meth)acrylic acid ester to the resultant reaction product to cause living anionic polymerization, obtaining a polymer (A), and bonding the polymer (A) and the block copolymer intermediate represented by the general formula (2), which is obtained by the above-mentioned method, by a displacement reaction of an anionic end of the polymer (A) by a halogen atom of the block copolymer intermediate.

The alkylene compound or phenylene compound having two halogenomethyl groups used in the above method is the above-mentioned coupling agent. Examples of the halogen atom that the coupling agent has include a fluorine atom, a chlorine atom, a bromine atom, and an iodine atom, but, of these halogen atoms, in view of excellent balance between the stability of the obtained block copolymer intermediate and the reactivity of the subsequent reaction, a bromine atom is preferred.

When the coupling agent is an alkylene compound, specific examples of the coupling agents include a 1,2-dihalogenoethane, a 1,3-dihalogenopropane, a 1,4-dihalogenobutane, a 1,5-dihalogenopentane, and a 1,6-dihalogenohexane. Further, when the coupling agent is a phenylene compound, specific examples of the coupling agents include an α,α'-dihalogenoxylene. Of these coupling agents, an α,α'-dihalogenoxylene is preferred because when producing a block copolymer intermediate by reacting a coupling agent with the polymer (A) or (S), the formation of a dimer which is a by-product can be suppressed. Further, an α,α'-dihalogeno-p-xylene is more preferred because when producing a block copolymer using the obtained block copolymer intermediate, the agent is unlikely to cause steric hindrance, so that a block copolymer can be efficiently obtained, and α,α'-dibromo-p-xylene is further preferred.

In the above-mentioned method, when raw materials, such as a monomer, a polymerization initiator, and a coupling agent, are introduced into the microreactor, it is preferred that each raw material is introduced in the form of a solution obtained by diluting or dissolving the raw material using an organic solvent.

Examples of the organic solvents include hydrocarbon solvents, such as pentane, hexane, octane, cyclohexane, benzene, toluene, xylene, decalin, tetralin, and derivatives thereof; and ether solvents, such as diethyl ether, tetrahydrofuran (THF), 1,4-dioxane, 1,2-dimethoxyethane, diethylene glycol dimethyl ether, and diglyme. These organic solvents can be used individually or in combination.

When a monomer is diluted with an organic solvent, a good balance between an efficient increase of the amount of the polymer produced per unit time and suppression of clogging of the channel due to gel formation in the microreactor is needed, and therefore the concentration of each constituent monomer in the monomer solution is preferably 0.1 M (mol/L, this applies to the followings) or more, more preferably in the range of from 0.1 to 3 M, further preferably in the range of from 0.2 to 2 M.

From the viewpoint of achieving an efficient increase of the amount of the polymer produced per unit time, the concentration of the polymerization initiator in the organic solvent solution is preferably 0.01 M or more, more preferably in the range of from 0.01 to 3 M, further preferably in the range of from 0.01 to 2 M. Further, with respect to the organic solvent used for diluting or dissolving the polymerization initiator to form a solution, taking into consideration the dissolving power for the organolithium polymerization initiator and the stability of the activity of the initiator, a hydrocarbon solvent, such as hexane, cyclohexane, benzene, toluene, or xylene, is preferred.

When the solutions of a monomer and a polymerization initiator at a high concentration are introduced into the channel of the microreactor, in order to cause living anionic polymerization to smoothly proceed, it is necessary that the high viscosity solution of the polymerization product of monomer formed by polymerization be surely fed into the channel of the microreactor. Particularly, in living anionic polymerization of the intermediate polymer obtained in each step and a monomer, it is necessary that the high-viscosity intermediate polymer solution and the low-viscosity monomer solution be surely mixed with each other, despite a large difference in the viscosity, to cause living anionic polymerization, making it possible to surely feed the high-viscosity solution of the formed block copolymer. As a pump for surely introducing such a high viscosity solution into the channel of the microreactor, preferred is a pump which enables high pressure feeding and has a pulsating flow markedly reduced, and, as such a pump, a plunger pump or a diaphragm pump is preferred.

Further, with respect to the feeding pressure upon introducing the solutions of a monomer, a polymerization initiator, and a coupling agent into the channel of the microreactor, in view of enabling efficient production of the polymer, the feeding pressure is preferably in the range of from 0.1 to 32 MPa, more preferably in the range of from 0.5 to 20 MPa, further preferably in the range of from 1 to 15 MPa. As a pump capable of feeding a solution at such a pressure, a plunger pump for liquid chromatography is preferred, and a double plunger pump is more preferred. Further preferred is a method of feeding a solution using a double plunger pump which has a damper attached to the outlet thereof so as to suppress a pulsating flow.

The microreactor used in the invention is a microreactor having a channel capable of mixing a plurality of liquids, preferably a microreactor having a heat-transfer reaction vessel having a channel formed, more preferably a microreactor having a heat-transfer reaction vessel having formed therein a microtubular channel, especially preferably a microreactor having a heat-transfer reaction vessel having heat-transfer plate structures, each having a plurality of groove portions formed in the surface thereof, which are stacked on one another.

The living anionic polymerization reaction in the invention can be conducted at a temperature of −78° C. or lower, which is the reaction temperature used in a conventional batch-wise manner reaction, but can be conducted at a temperature of −40° C. or higher, which is the temperature that is industrially practical, and can be conducted at −28° C. or higher, and, for suppressing gel formation in the microreactor, the reaction temperature is especially preferably −15° C. or higher. When the reaction temperature is −40° C. or higher, the polymer can be produced using a cooling apparatus having a simple construction, so that the production cost can be advantageously reduced. Further, when the temperature is −28° C. or higher, the polymer can be produced using a cooling apparatus having a simpler construction, so that the production cost can be advantageously considerably reduced.

In the invention, a preferred mode of the micromixer system for mixing the solutions of a monomer and the like is preferably a micromixer capable of mixing a monomer solution and a polymerization initiator solution at a high concentration in a short time for introducing the solutions at a high concentration, as compared to that in a conventional method, into the channel of the microreactor to cause living anionic polymerization to smoothly proceed.

The micromixer is the channel of the microreactor, which is capable of mixing a plurality of liquids, and, with respect to the micromixer, a commercially available micromixer can be used, and examples include a microreactor having an interdigital channel structure, Single mixer and Caterpillar mixer, manufactured by InstitutfürMikrotechnikMainz (IMM); Micro glass reactor, manufactured by Micro Glass Co., Ltd.; Cytos, manufactured by CPC Systems, Inc.; YM-1, YM-2 type mixer, manufactured by Yamatake Co., Ltd.; Mixing T and T (T-connector), manufactured by Shimadzu GLC Ltd.; IMT chip reactor, manufactured by Institute of Microchemical Technology Co., Ltd.; and Micro Hi-Mixer, which is a product developed by Toray Engineering Co., Ltd., and any of these micromixers can be used in the invention.

The micromixer system is preferably a micromixer in which a channel space that is relatively large, as compared to the liquid introduction channel for the micromixer, is formed in the mixing portion. By using such a micromixer system, it is possible to efficiently mix a low-viscosity solution and a high-viscosity solution.

The micromixer in which a channel space that is relatively large, as compared to the liquid introduction channel for the micromixer, is formed in the mixing portion may be a metal integral micromixer, and may be a combination of a micromixer in which process plates having a channel through which two types of solutions pass are stacked on one another and the two types of solutions are mixed at the outlet of the channel, and a micromixer having a channel through which the mixed solution passes.

Further, the channel internal diameter of the inlet portion of the micromixer varies depending on the linear speed of the reaction mixture, but is preferably in the range of from 0.1 to 2.0 mm, more preferably in the range of from 0.2 to 1.5 mm. Further, the channel internal diameter of the inlet portion of the micromixer is preferably in the range of from 1 to 5 times the channel internal diameter of the inlet portion, and is more preferably in the range of from 1.5 to 3 times because the amount of the polymer produced per unit time can be further increased, and the mixing efficiency can be improved.

With respect to the reaction apparatus used in the method of the invention, preferred is a reaction apparatus having a heat-transfer reaction vessel having a channel formed, and the channel is preferably a channel which is microtubular because it is possible to quickly control heating. With respect to the microtubular channel, preferred is a channel having such a void size that the channel cross-sectional area is 0.1 to 4.0 mm$^2$, in view of controlling the polymerization reaction temperature. In the invention, the term "cross-sectional" means a cross-section taken along the direction perpendicular to the flow direction in the channel, and the term "cross-sectional area" means an area of the cross-section.

The cross-sectional form of the channel may be a rectangular form including square and rectangle, a polygonal form including trapezoid, parallelogram, triangle, pentagon, and the like (including these forms having the corners rounded, and a form having a high aspect ratio, i.e., a slit form), a star form, a circular form including semicircle and ellipse, or the like. The cross-sectional form of the channel need not be consistent.

With respect to the method for forming the reaction channel, there is no particular limitation, but, generally, a member (I) having a plurality of grooves in the surface thereof and another member (II) are fixed by stacking or bonding the member (II) onto the surface of the member (I) having the grooves, forming a channel as a space between the member (I) and the member (II).

The channel may be further provided with a heat exchange function. In this case, for example, a member (X) having formed in the surface thereof grooves for flowing a temperature control fluid and another member may be fixed by a method, e.g., bonding or stacking the another member onto the surface having formed the grooves for flowing a temperature control fluid. Generally, a member (I) having grooves in the surface thereof and a member (II) having formed grooves for flowing a temperature control fluid may be fixed so that the surface having formed the grooves is fixed to the surface on the other side of the surface of another member having formed the grooves, forming a channel, and a plurality of the members (I) and members (II) may be alternately fixed to one another.

In this case, the grooves formed in the surface of the member may be formed as so-called grooves which are lower than the surroundings, and may be formed as spaces between walls present on the surface of the member. The method for forming grooves in the surface of the member is arbitrary, and, for example, a method, such as injection molding, a solvent casting method, a melt replica method, cutting, etching, photolithography (including energy ray lithography), or laser ablation, can be used.

The layout of the channel in the member may be a linear, branched, comb-like, curved, spiral winding, or zigzag configuration or other arbitrary configurations according to the use or purpose.

The channel may be additionally connected to, for example, a mixing field, an extraction field, a separation field, a flow rate measuring part, a detector, a storage vessel, a membrane separation mechanism, a connection port into or out of the device, a circuit, a development channel for chromatography or electrophoresis, a part of a valve structure (surrounding part of a valve), a pressurizing mechanism, an evacuating mechanism, or the like.

With respect to the external shape of the member, there is no particular limitation, and a form according to the use or purpose can be employed. The form of the member may be, for example, a plate form, a sheet form (including a film form, a ribbon form, and the like), a coating film form, a rod form, a tube form, or other complicated shape of a molded article. An external size, such as a thickness, is preferably consistent. The material for the member is arbitrary, and may be, for example, a polymer, glass, ceramic, a metal, or a semiconductor.

As mentioned above, the reaction apparatus used in the method of the invention is preferably a reaction apparatus having a heat-transfer reaction vessel having a channel formed, and may be a tube immersed in an oil bath, a water bath, or the like. Further, as the reaction apparatus having a heat-transfer reaction vessel having a channel formed, there can be used a reaction apparatus having a structure in which heat-transfer plate structures, each having a plurality of groove portions formed in the surface thereof, are stacked on one another.

As such a reaction apparatus, there can be mentioned, for example, an apparatus having the above-mentioned channel (hereinafter, referred to simply as "microchannel") formed in a member used as a device for chemical reaction.

In the synthesis of the block copolymer represented by the general formula (3) above, the polymer (S) or polymer (A) having an anionic end may be synthesized using either the above-described microreactor or a batch reactor.

With respect to the batch reactor, a known batch reactor can be used.

In the synthesis of the block copolymer represented by the general formula (3) above, for removing water contained in a very small amount in the solution of the block copolymer intermediate represented by the general formula (1) or (2) above, it is preferred that diethylzinc is added. The amount of the diethylzinc added is preferably in the range of from 0.1 to 5 parts by mass, relative to 100 parts by mass of the solution of the block copolymer intermediate.

The ratio of the reaction of the polymer (S) or polymer (A) having an anionic end and the block copolymer intermediate represented by the general formula (1) or (2) above is preferably in the range of from 1 to 10/1 (molar ratio). Further, from the viewpoint of achieving a further improvement of the yield and facilitating the below-mentioned purification step, the ratio of the reaction is more preferably in the range of from 1 to 5/1 (molar ratio). When the anionic end is present in an excess amount, the reaction solution has a red color.

Further, in the reaction of the polymer (S) or polymer (A) having an anionic end and the block copolymer intermediate represented by the general formula (1) or (2) above, from the viewpoint of achieving suppression of a side reaction and preventing deactivation of the anionic end, the reaction temperature is preferably in the range of from −60 to −100° C., more preferably in the range of from −70 to −80° C.

In the synthesis of the block copolymer represented by the general formula (3) above using the block copolymer intermediate represented by the general formula (1) above, purification of the block copolymer is made by removing the polymer (S) used in an excess amount. As a method for the purification, a reprecipitation method is preferred. As an operation for reprecipitation method, for example, there can be mentioned a method in which a solution obtained by dissolving a crude product of the block copolymer in a small amount of a good solvent is slowly added to a large amount of a poor solvent, or a large amount of a poor solvent is added to a solution obtained by dissolving a crude product of the block copolymer in a good solvent to obtain a product in the form of precipitate, and the precipitate is separated and recovered by filtration, obtaining a purified block copolymer.

With respect to the good solvent used in the purification of the block copolymer represented by the general formula (3) above, preferred is tetrahydrofuran, toluene, or the like. Further, with respect to the poor solvent, preferred is cyclohexane which is a good solvent for polystyrene. In the block copolymer of the general formula (3) wherein $Y^2$ is a polymer block of styrene, and $Y^1$ is a polymer block of methyl methacrylate, when the mass ratio of $Y^2$ to $Y^1$ [$Y^2/Y^1$] is in the range of from 50/50 to 99/1, that is, the mass ratio of the styrene polymer block is high, the block copolymer itself is dissolved in cyclohexane which is a poor solvent, and therefore, for the purpose of reducing dissolution of the block copolymer in cyclohexane and removing only the unnecessary polymer (S) to obtain a high-purity block copolymer, it is preferred that a certain amount of a hydrocarbon solvent, such as hexane or heptane, is added to cyclohexane.

In the synthesis of the block copolymer represented by the general formula (3) above using the block copolymer intermediate represented by the general formula (2) above, purification of the block copolymer is made by removing the polymer (A) used in an excess amount. As a method for the purification, a reprecipitation method is preferred like the purification of the block copolymer represented by the general formula (3) above. For example, with respect to the block copolymer of the general formula (3) wherein $Y^1$ is a polymer block of methyl methacrylate, and $Y^2$ is a polymer block of styrene, for removing the polymer (A) from the block copolymer, it is preferred that tetrahydrofuran, toluene, or the like, which has high dissolving power for the block copolymer, is used as a good solvent, and acetonitrile, which has high dissolving power for polymethyl methacrylate and low dissolving power for the block copolymer, is used as a poor solvent.

EXAMPLES

Hereinbelow, the present invention will be described in more detail with reference to the following Examples, which should not be construed as limiting the scope of the invention.

<Micromixer Used in the Examples>

The microreactor used in the present Examples has a micromixer composed of a T shaped junction, and a tube reactor connected downstream of the micromixer. With respect to the micromixer, a custom-made micromixer by Sanko Seiki Kogyo Co., Ltd. was used (a micromixer equivalent to that in the present Examples is available by requesting the production based on the description of the present Examples). The micromixer used in the present Examples has therein a first introduction channel, a second introduction channel, and part of the channel where these introduction channels meet, and, in the micromixer, all the channels have the same internal diameter. Therefore, hereinafter, the internal diameter of these channels is collectively referred to as "the internal diameter of the micromixer".

With respect to the polymers produced in the present Examples and Comparative Examples, the method for measuring a number average molecular weight and a weight average molecular weight is as described below.

[Method for Measuring a Number Average Molecular Weight and a Weight Average Molecular Weight]

A number average molecular weight (Mn) and a weight average molecular weight (Mw) of a polymer were measured by a gel permeation chromatography (GPC) method.

Measuring apparatus: High-speed GPC apparatus ("HLC-8220GPC", manufactured by Tosoh Corp.)
  Columns: The columns shown below, manufactured by Tosoh Corp., which are connected in series were used.
    "TSKgel G5000" (7.8 mm I.D.×30 cm)×1
    "TSKgel G4000" (7.8 mm I.D.×30 cm)×1
    "TSKgel G3000" (7.8 mm I.D.×30 cm)×1
    "TSKgel G2000" (7.8 mm I.D.×30 cm)×1
  Detector: RI (differential refractometer)
  Column temperature: 40° C.
  Eluent: Tetrahydrofuran (THF)
  Flow rate: 0.5 mL/minute
  Sample amount per injection: 20 μL (tetrahydrofuran solution having a sample concentration of 1.0% by mass)
  Standard sample: A calibration curve was prepared using the standard polystyrenes shown below.
  (Standard Polystyrenes)
    "TSKgel standard polystyrene kit PStQuick B", manufactured by Tosoh Corp.
    "TSKgel standard polystyrene kit PStQuick C", manufactured by Tosoh Corp.
    "TSKgel standard polystyrene kit PStQuick D", manufactured by Tosoh Corp.

[Method for Measuring a Residual Monomer Content]

A residual monomer content of a polymer was measured by a gas chromatography (GC) method.

Measuring apparatus: GC apparatus ("GC-2014", manufactured by Shimadzu Corporation)
  Column: "DB-WAX", manufactured by Agilent Technologies, Inc., (0.53 mm×30 m)×1
  Vaporizing chamber temperature: 160° C.

Column temperature: 40 to 230° C.; Temperature increase rate: 10° C./minute
Detector: FID; Detector use temperature: 300° C.
Carrier gas: He; Flow rate: 20.0 mL/minute
Sample amount per injection: 1.0 µL (tetrahydrofuran solution having a sample concentration of 0.4% by mass)

[Method for Measuring a Dibromoxylene Addition Ratio]

When dibromoxylene (hereinafter, abbreviated to "DBX") is added to the polymer block, the $^1$H-NMR chemical shift of $CH_2$ at the benzyl position of DBX shifts from 4.477 ppm (before addition) to 4.467 ppm (after addition), namely to the high magnetic field side. Using this absorption shift, a DBX addition ratio was determined. Conditions for the NMR measurement are shown below.

Measuring apparatus: NMR apparatus ("JMTC-400/54", manufactured by Japan Superconductor Technology, Inc.)
Solvent: $CDCl_3$
Standard substance: TMS (tetramethylsilane)
Measurement mode: $^1$H-NMR
Accumulation number: 1,000

Example 1: Synthesis of a Block Copolymer Intermediate (1)

Five types of the solutions shown below were first prepared.
(1) n-Butyllithium (0.033 M) Solution
Using a syringe, 422 g of toluene and 13.6 mL of a 1.55 M n-butyllithium (hereinafter, abbreviated to "n-BuLi") solution were placed in a 500 mL medium bottle purged with argon gas and stirred to prepare 500 mL of a solution having a n-BuLi concentration of 0.033 M.
(2) 1,1-Diphenylethylene (0.0082 M) Solution
Using a syringe, 3.70 g (3.6 mL) of 1,1-diphenylethylene (hereinafter, abbreviated to "DPE"), 102 mL of a 0.5 M THF solution of lithium chloride, and 2,127 g of THF were placed in a 3 L medium bottle purged with argon gas and stirred to prepare 2,500 mL of a solution having a DPE concentration of 0.0082 M and a lithium chloride concentration of 0.02 M.
(3) Methyl Methacrylate (1.5 M) Solution
Using a syringe, 120.1 g (127.8 mL) of methyl methacrylate (hereinafter, abbreviated to "MMA"), 590 g of tetrahydrofuran (hereinafter, abbreviated to "THF"), and 9 ml of a 1 M hexane solution of diethylzinc were placed in a 1 L medium bottle purged with argon gas and stirred to prepare 800 mL of a solution having an MMA concentration of 1.5 M and a diethylzinc concentration of 0.011 M.
(4) Dibromoxylene (0.15 M) Solution
18.0 g of α,α'-dibromo-p-xylene (hereinafter, abbreviated to "DBX") and 200 mL of THF were placed in a 500 mL eggplant-shaped flask purged with argon gas and stirred to prepare a 0.33 M DBX solution. Using a syringe, 181 mL of the 0.33 M DBX solution, 185.5 g of THF, and 10 ml of a 1 M hexane solution of diethylzinc were placed in a 500 mL medium bottle purged with argon gas and stirred to prepare 400 mL of a solution having a DBX concentration of 0.15 M and a diethylzinc concentration of 0.025 M.
(5) Methanol (1.5 M) Solution
Using a syringe, 2.48 g of methanol and 46.9 mL of THF were placed in a 100 mL eggplant-shaped flask purged with argon gas and stirred to prepare 50 mL of a methanol solution having a concentration of 1.5 M.

Then, living anionic polymerization of MMA and DBX addition was conducted according to the following operation. A microreactor apparatus having a micromixer composed of three T-joints and a tube reactor connected downstream of the micromixer, four plunger pumps ("PU714" and "PU716", manufactured by GL Science Inc.), and the respective medium bottles for the prepared n-BuLi solution, DPE solution, MMA solution, and DBX solution were connected, and set so that the respective solutions were fed using the four plunger pumps to the microreactor apparatus. From the upstream side of a reactor having a micromixer having a pipe joint diameter of 250 µm and (internal diameter: 0.5 mm, length: 100 cm)+(internal diameter: 2.17 mm, length: 400 c) tube reactors, the n-BuLi solution was fed at a rate of 6.0 mL/minute and the DPE solution was fed at a rate of 30.0 mL/minute and the solutions were mixed to perform a reaction of n-BuLi and DPE. Subsequently, from the upstream side of a reactor having a micromixer having a pipe joint diameter of 250 µm and (internal diameter: 0.25 mm, length: 20 cm)+(internal diameter: 1 mm, length: 300 cm)+(internal diameter: 2.17 mm, length: 400 cm) tube reactors, the obtained DPE reaction solution and the MMA solution were fed at a rate of 5.0 mL/minute and mixed to perform polymerization of the DPE reaction solution and MMA. Finally, from the upstream side of a reactor having a micromixer having a pipe joint diameter of 250 µm and (internal diameter: 0.5 mm, length: 100 cm)+(internal diameter: 2.17 mm, length: 1,000 cm) tube reactors, the obtained MMA polymerization solution and the DBX solution were fed at a rate of 1.3 mL/minute and mixed to perform a reaction of the MMA polymerization solution and DBX. All the above reactions were conducted while being immersed in a temperature controlled bath at −45° C.

The above-obtained reaction solution was poured into the methanol solution to terminate the reaction, obtaining a solution of a block copolymer intermediate (1). A simplified procedure for reaction in Example 1 is shown in FIG. 1.

From the residual monomer content of the above-obtained solution of the block copolymer intermediate (1), the reaction ratio (polymer conversion) of MMA was found to be 100%. Further, the obtained polymer had a number average molecular weight (Mn) of 6,320, a weight average molecular weight (Mw) of 7,250, and a degree of dispersion (Mw/Mn) of 1.15.

100 mL of the above-obtained THF solution of the block copolymer intermediate (1) was dropwise added to 400 mL of heptane to perform reprecipitation purification, removing the unreacted monomer and DBX. The resultant intermediate was subjected to filtration and dried, and then dissolved in 30 mL of toluene, and subjected to diatomaceous earth filtration to remove a metal salt. Then, the toluene solution was dropwise added to 400 mL of heptane to perform reprecipitation purification. From the $^1$H-NMR measurement, the DBX addition ratio of the purified block copolymer intermediate (1) was found to be 57%.

Examples 2 and 3: Synthesis of Block Copolymer Intermediates (2) and (3)

Block copolymer intermediates (2) and (3) were obtained in accordance with substantially the same procedure as in Example 1 except that the feed rate of DBX was changed as shown in Table 1.

The conditions for the synthesis of the block copolymer intermediates (1) to (3) and the results of the measurement for the obtained intermediates are shown in Tables 1 and 2.

TABLE 1

| | Solution concentration (M) | | | | Feed rate (mL/min.) | | | | Reaction (polymerization) temperature (° C.) | | | |
|---|---|---|---|---|---|---|---|---|---|---|---|---|
| | n-BuLi | DPE | MMA | DBX | n-BuLi | DPE | MMA | DBX | n-BuLi | DPE | MMA | DBX |
| Example 1 | 0.0325 | 0.0082 | 1.5 | 0.15 | 6.0 | 30.0 | 5.0 | 1.3 | 0 | −10 | −45 | −50 |
| Example 2 | 0.0325 | 0.0082 | 1.5 | 0.15 | 6.0 | 30.0 | 5.0 | 3.0 | 0 | −10 | −45 | −50 |
| Example 3 | 0.0325 | 0.0082 | 1.5 | 0.15 | 6.0 | 30.0 | 5.0 | 6.0 | 0 | −10 | −45 | −50 |

TABLE 2

| | Block copolymer intermediate | Residence time (Reaction (polymerization)) time (sec) | | | | Concentration (mmol/L) in reacting DBX | MMA Reaction ratio (%) | Molecular weight | | Dispersion degree | DBX Addition ratio (%) |
|---|---|---|---|---|---|---|---|---|---|---|---|
| | | n-BuLi | DPE | MMA | DBX | | | Mn | Mw | | |
| Example 1 | (1) | 1.3 | 28.9 | 22.8 | 52.7 | 4.6 | 100 | 6,320 | 7,250 | 1.15 | 57 |
| Example 2 | (2) | 1.3 | 28.9 | 22.8 | 50.7 | 10.2 | 99.7 | 6,250 | 7,040 | 1.13 | 68 |
| Example 3 | (3) | 1.3 | 28.9 | 22.8 | 47.5 | 19.1 | 99.5 | 6,230 | 7,000 | 1.12 | 85 |

Example 4: Synthesis of a Styrene Polymer Block (1) by Means of a Batch Reactor 145.2 g (167.5 mL) of toluene and 57.7 g (0.55 mol) of styrene (hereinafter, abbreviated to "St") were placed in a 200 mL eggplant-shaped flask purged with argon gas, and cooled to 10° C. and stirred until the solution became uniform. As a polymerization initiator, 3.57 mL (0.0036 mol) of a sec-BuLi solution (1.0 M cyclohexane solution) was added, and the solution was changed in color to yellow, and subsequently stirred for 1.5 hours. Then, a mixture of 1.0 g (0.0055 mol) of DPE and 5.0 mL of toluene was added, and the solution was gradually changed in color to red, and subsequently stirred for 30 minutes to obtain a solution of a styrene polymer block (1). A small amount of a sample was taken and subjected to analysis. From the residual monomer content determined by GC, the reaction ratio (polymer conversion) of St was found to be 100%. Further, the obtained styrene polymer block (1) had a number average molecular weight (Mn) of 15,000, a weight average molecular weight (Mw) of 15,500, and a degree of dispersion (Mw/Mn) of 1.03.

Example 5: Synthesis of a Styrene Polymer Block (2) by Means of a Microreactor

Four types of the solutions shown below were first prepared.
(1) n-BuLi (0.015 M) Solution
Using a syringe, 386.3 g of toluene and 4.35 mL of a 1.55 M n-BuLi solution were placed in a 500 mL medium bottle purged with argon gas and stirred to prepare 450 mL of a solution having a n-BuLi concentration of 0.015 M.
(2) Styrene (3.0 M) Solution
Using a syringe, 250.0 g (276.0 mL) of styrene (hereinafter, abbreviated to "St") and 466.0 g of THF were placed in a 1 L medium bottle purged with argon gas and stirred to prepare 800 mL of a solution having a St concentration of 3.0 M.
(3) DPE (0.0040 M) Solution
Using a syringe, 1.44 g (1.4 mL) of DPE and 1,777 g of THF were placed in a 3 L medium bottle purged with argon gas and stirred to prepare 2,000 mL of a solution having a DPE concentration of 0.0040 M.

Then, living anionic polymerization of St was conducted according to the following operation. A microreactor apparatus having a micromixer composed of two T shaped junctions and a tube reactor connected downstream of the micromixer, three plunger pumps ("PU714" and "PU716", manufactured by GL Science Inc.), and the respective medium bottles for the prepared n-BuLi solution, St solution, and DPE solution were connected, and set so that the respective solutions were fed using the three plunger pumps to the microreactor apparatus. From the upstream side of a reactor having a micromixer having a pipe joint diameter of 250 μm and (internal diameter: 1.0 mm, length: 100 cm)+ (internal diameter: 2.17 mm, length: 200 c) tube reactors, the n-BuLi solution was fed at a rate of 2.5 mL/minute and the St solution was fed at a rate of 7.5 mL/minute and the solutions were mixed to perform a reaction of n-BuLi and St. Subsequently, from the upstream side of a reactor having a micromixer having a pipe joint diameter of 500 μm and (internal diameter: 1.0 mm, length: 100 cm)+(internal diameter: 2.17 mm, length: 400 cm) tube reactors, the obtained reaction solution and the DPE solution were fed at a rate of 20.0 mL/minute and mixed to perform a reaction of DPE and the St polymerization product, obtaining a styrene polymer block (2). All the above reactions were conducted while being immersed in a temperature controlled bath at −15° C.
From the residual monomer content determined by the GC measurement, the reaction ratio (polymer conversion) of St was found to be 100%. Further, the obtained polymer had a number average molecular weight (Mn) of 68,300, a weight average molecular weight (Mw) of 71,800, and a degree of dispersion (Mw/Mn) of 1.05.

Example 6: Synthesis of a Block Copolymer (1)

0.5 g of the block copolymer intermediate (3) obtained in Example 3 was dissolved in 20.0 mL of THF. To the resultant solution was added 0.5 mL of diethylzinc. While stirring, the resultant solution was cooled to −70° C. 1.9 mL (excess amount) of the solution of the styrene polymer block (1) obtained in Example 4 was added and the resultant mixture was subjected to reaction at −70° C. for one hour (the reaction solution had a pale red color), and then methanol was added to terminate the reaction, obtaining a solution of a block copolymer (1).

20 mL of the above-obtained solution of the block copolymer (1) was dropwise added to 100 mL of a mixed solution of cyclohexane/heptane=10/3 (mass ratio) to perform reprecipitation purification, removing the unreacted styrene polymer block (1). Then, the resultant block copolymer was subjected to filtration and dried, and then dispersed in 10 mL of acetonitrile, and subjected to filtration to remove the unreacted block copolymer intermediate (3). The obtained block copolymer (1) had a number average molecular weight (Mn) of 19,600, a weight average molecular weight (Mw) of 20,200, and a degree of dispersion (Mw/Mn) of 1.03.

Example 7: Synthesis of a Block Copolymer (2)

In a 500 mL medium bottle purged with argon gas, 5 g of the block copolymer intermediate (3) obtained in Example 3 was dissolved in 200.0 mL of THF, and 2.0 mL of a 1 M hexane solution of diethylzinc was added to the resultant solution. The prepared solution of the block copolymer intermediate (3) was connected to the medium bottle, and set so as to be fed to the microreactor apparatus using a plunger pump. From the upstream side of a reactor having a micromixer having a pipe joint diameter of 250 μm and (internal diameter: 0.5 mm, length: 100 cm)+(internal diameter: 2.17 mm, length: 60 m) tube reactors, the solution of the styrene polymer block (2) obtained in Example 5 was fed at a rate of 30.0 mL/minute and the solution of the block copolymer intermediate (3) was fed at a rate of 5.0 mL/minute and the solutions were mixed to perform a reaction. All the above reactions were conducted while being immersed in a temperature controlled bath at −70° C.

Figure 2:
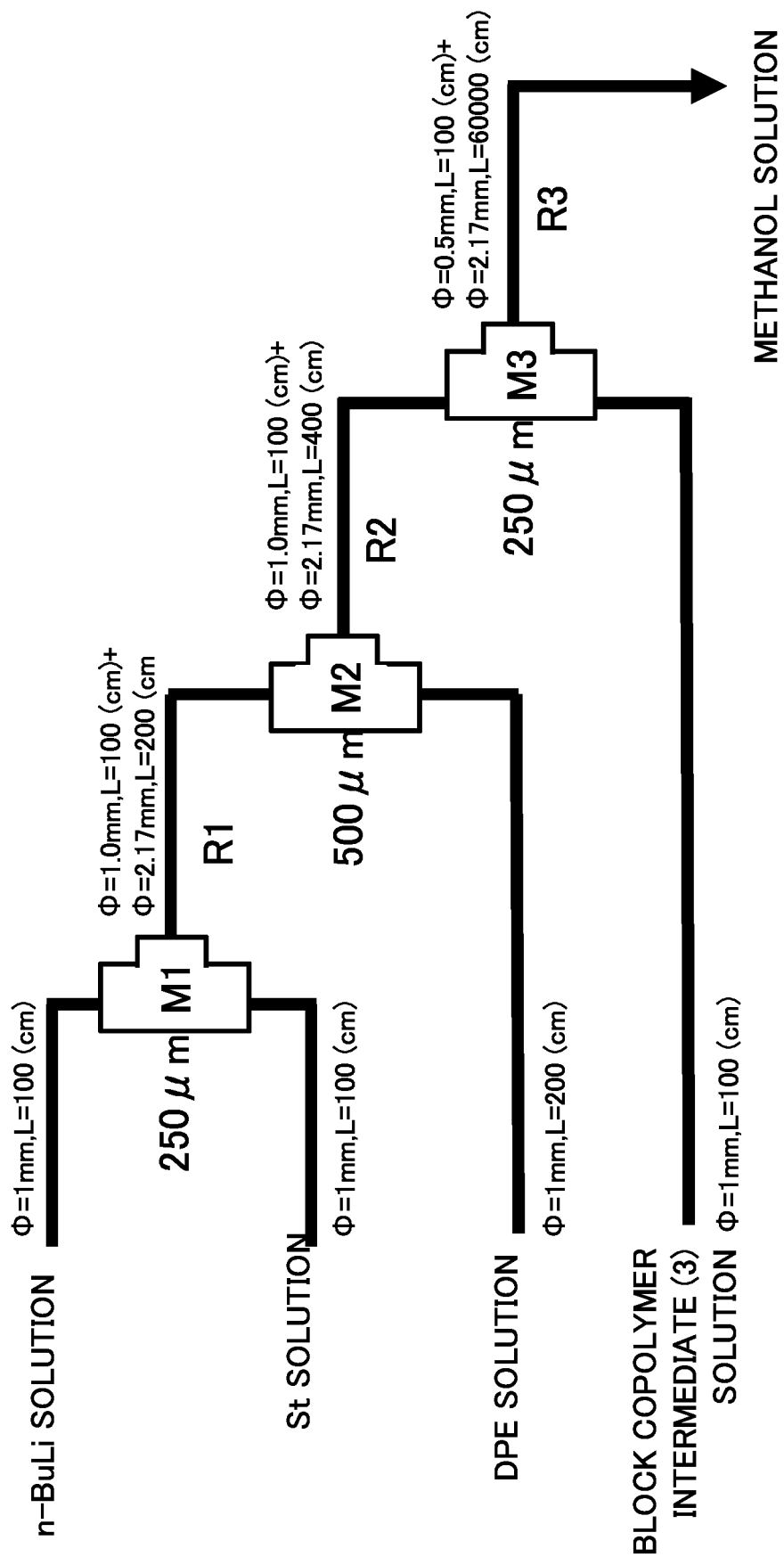
FIG. 2 shows a simplified procedure for reaction in Example 7.

The pale red reaction solution was poured into the methanol solution prepared in Example 1 to terminate the reaction, obtaining a solution of a block copolymer (2). A simplified procedure for reaction in Example 7 is shown in FIG. 2.

20 mL of the above-obtained solution of the block copolymer (2) was dropwise added to 100 mL of a mixed solution of cyclohexane/heptane=10/3 (mass ratio) to perform reprecipitation purification, removing the unreacted styrene polymer block (2). Then, the resultant block copolymer was subjected to filtration and dried, and then dispersed in 10 mL of acetonitrile, and subjected to filtration to remove the unreacted block copolymer intermediate (3). The obtained polymer had a number average molecular weight (Mn) of 73,500, a weight average molecular weight (Mw) of 79,200, and a degree of dispersion (Mw/Mn) of 1.08.

With respect to the block copolymer intermediate and styrene polymer block which are raw materials used in Examples 6 and 7, and the obtained block copolymers (1) and (2), the molecular weight and the degree of dispersion are shown in Table 3.

The invention claimed is:
1. A block copolymer intermediate represented by the following general formula (1) or (2):

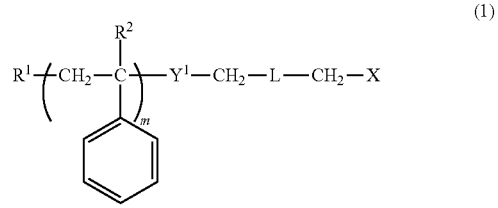

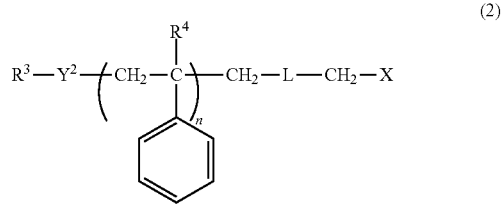

wherein, in the general formulae (1) and (2),
each of $R^1$ and $R^3$ independently represents a polymerization initiator residue,
each of $R^2$ and $R^4$ independently represents an aromatic group or an alkyl group,
$Y^1$ represents a polymer block of (a)an (meth)acrylic acid ester,
$Y^2$ represents a polymer block of styrene or a derivative thereof,
L represents an alkylene group, a phenylene group, or a single bond,
X represents a halogen atom, and
each of m and n independently represents an integer of 1 to 5.

2. A block copolymer represented by the following general formula (3):

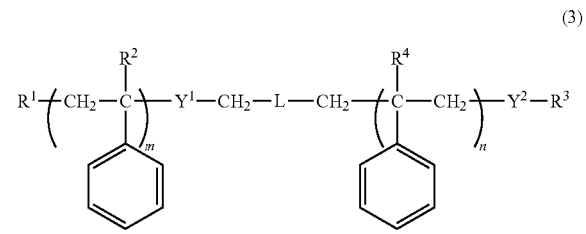

wherein, in the general formula (3),
each of $R^1$ and $R^3$ independently represents a polymerization initiator residue,
each of $R^2$ and $R^4$ independently represents an aromatic group or an alkyl group,

TABLE 3

| | | Block copolymer intermediate | | | | Styrene polymer block | | | | Block copolymer | | |
|---|---|---|---|---|---|---|---|---|---|---|---|---|
| | | Mn | Mw | Dispersion degree | | Mn | Mw | Dispersion degree | | Mn | Mw | Dispersion degree |
| Example 6 | (3) | 6,230 | 7,000 | 1.12 | (1) | 15,000 | 15,300 | 1.03 | (1) | 19,600 | 20,200 | 1.03 |
| Example 7 | (3) | 6,230 | 7,000 | 1.12 | (2) | 68,300 | 71,800 | 1.05 | (2) | 73,500 | 79,200 | 1.08 |

Y¹ represents a polymer block of (a)an (meth)acrylic acid ester,

Y² represents a polymer block of styrene or a derivative thereof,

L represents an alkylene group, a phenylene group, or a single bond, and each of m and n independently represents an integer of 1 to 5.

3. A method for producing the block copolymer intermediate represented by the general formula (1) according to claim 1, the method comprising, providing a microreactor having a channel capable of mixing a plurality of liquids, reacting a polymerization initiator and diphenylethylene in the microreactor to form a reaction product, and then introducing (a)an (meth)acrylic acid ester to the reaction product in the microreactor to cause living anionic polymerization to obtain a polymer (A), and reacting an anionic end of the polymer (A) and an alkylene compound or phenylene compound having two halogenomethyl groups to form the block copolymer intermediate represented by the general formula (1).

4. A method for producing the block copolymer intermediate represented by the general formula (2) according to claim 1, the method comprising, providing a microreactor having a channel capable of mixing a plurality of liquids, subjecting styrene or a derivative thereof to living anionic polymerization in the presence of a polymerization initiator in the microreactor to form a reaction product, and then reacting the reaction product in the microreactor with diphenylethylene to obtain a polymer(S), and reacting an anionic end of the polymer(S) and an alkylene compound or phenylene compound having two halogenomethyl groups to form the block copolymer intermediate represented by the general formula (2).

5. A method for producing the block copolymer represented by the general formula (3)

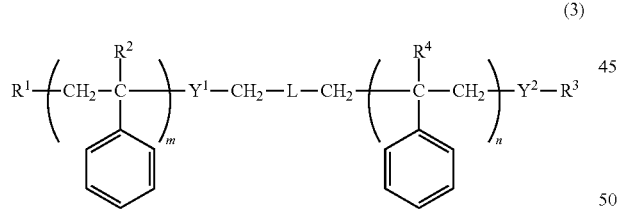

(3)

wherein, in the general formula (3), each of R¹ and R³ independently represents a polymerization initiator residue, each of R² and R⁴ independently represents an aromatic group or an alkyl group, Y¹ represents a polymer block of (a)an (meth)acrylic acid ester, Y² represents a polymer block of styrene or a derivative thereof, L represents an alkylene group, a phenylene group, or a single bond, and each of m and n independently represents an integer of 1 to 5, the method comprising, providing a reactor, wherein the reactor is a microreactor having a channel capable of mixing a plurality of liquids or a batch reactor, subjecting styrene or a derivative thereof to living anionic polymerization in the presence of a polymerization initiator in the reactor to form a reaction product, and then reacting the reaction-product with diphenylethylene in the reactor to obtain a polymer (S), and bonding the polymer(S) and the block copolymer intermediate represented by the general formula (1) according to claim 1 by a displacement reaction of an anionic end of the polymer(S) by a halogen atom of the block copolymer intermediate to form the block copolymer intermediate by the general formula (3).

6. A method for producing the block copolymer represented by the general formula (3)

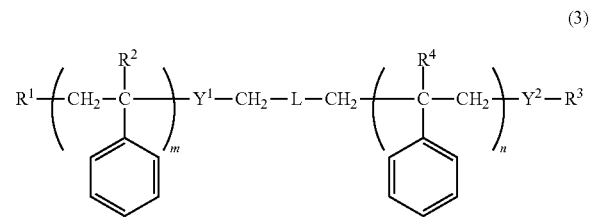

(3)

wherein, in the general formula (3), each of R¹ and R³ independently represents a polymerization initiator residue, each of R² and R⁴ independently represents an aromatic group or an alkyl group, Y¹ represents a polymer block of (a)an (meth)acrylic acid ester, Y² represents a polymer block of styrene or a derivative thereof, L represents an alkylene group, a phenylene group, or a single bond, and each of m and n independently represents an integer of 1 to 5, the method comprising, providing a reactor, wherein the reactor is a microreactor having a channel capable of mixing a plurality of liquids or a batch reactor, reacting a polymerization initiator and diphenylethylene in the reactor to form a reaction product, and then introducing (a)an (meth)acrylic acid ester to the reaction product in the reactor to cause living anionic polymerization to obtain a polymer (A), and bonding the polymer (A) and the block copolymer intermediate represented by the general formula (2) according to claim 1 by a displacement reaction of an anionic end of the polymer (A) by a halogen atom of the block copolymer intermediate to form the block copolymer intermediate by the general formula (3).

* * * * *